United States Patent [19]

Bolton et al.

[11] Patent Number: 4,488,151
[45] Date of Patent: Dec. 11, 1984

[54] ARBITER SWITCH FOR A CONCURRENT NETWORK OF PROCESSORS

[75] Inventors: Brent C. Bolton, Austin; Gary L. Logsdon, Round Rock, both of Tex.; Carl F. Hagenmaier, Jr., Pittstown, N.J.; Jesse R. Wilson, Austin, Tex.

[73] Assignee: Burroughs Corporation, Detroit, Mich.

[21] Appl. No.: 329,424

[22] Filed: Dec. 10, 1981

[51] Int. Cl.³ ............................ H04Q 9/00; H04J 3/02
[52] U.S. Cl. ................................. 340/825.5; 370/85; 340/825.03
[58] Field of Search ........... 340/825.5, 825.51, 825.02, 340/825.03; 370/13, 14, 91, 54, 61, 85; 371/22, 12

[56] References Cited

U.S. PATENT DOCUMENTS

| | | | |
|---|---|---|---|
| 3,460,098 | 8/1969 | Blauw | 370/91 |
| 3,906,164 | 9/1975 | Philip et al. | 370/54 |
| 3,967,072 | 6/1976 | Dimmick et al. | 370/54 |
| 4,262,357 | 4/1981 | Shima | 370/85 |
| 4,342,995 | 8/1982 | Shima | 370/85 |
| 4,390,981 | 6/1983 | Wood et al. | 370/61 |

Primary Examiner—Donald J. Yusko
Attorney, Agent, or Firm—Mervyn L. Young; Kevin R. Peterson

[57] ABSTRACT

Disclosed is an arbiter switch for use in forming an asynchronous network of concurrent processors where the arbiter switch receives a message from one of two input ports and transmits it to its output port. A path through the network which has been established can be cleared should it become apparent that particular path has become locked in due to a malfunction of a component in one of the nodes or switches in the network.

10 Claims, 13 Drawing Figures

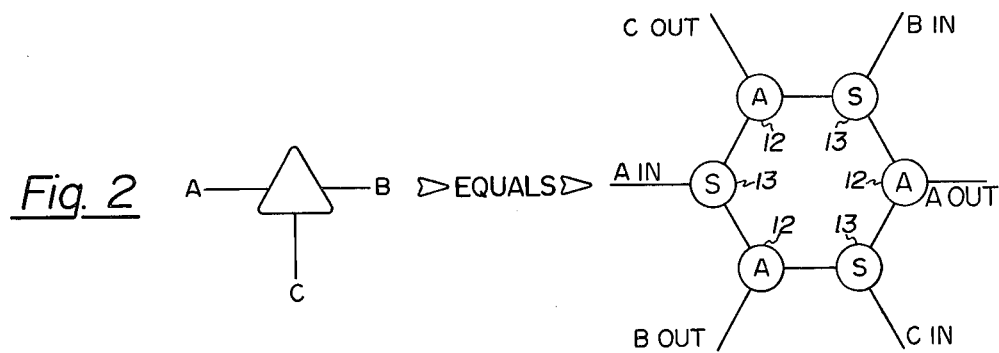
Fig. 2
Fig. 3A
| END | CHECK | DATA | SOURCE | DEST. | ROUTE |
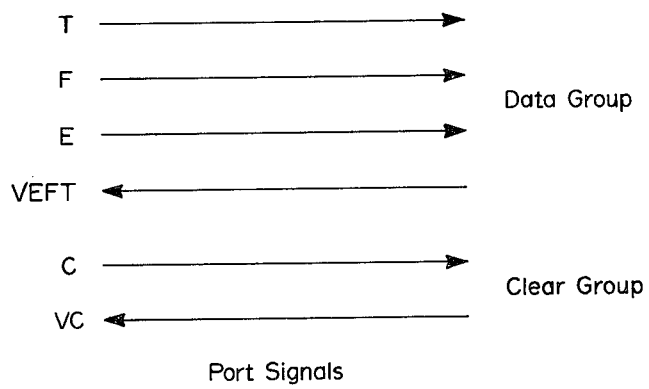
Fig. 3B
Port Signals

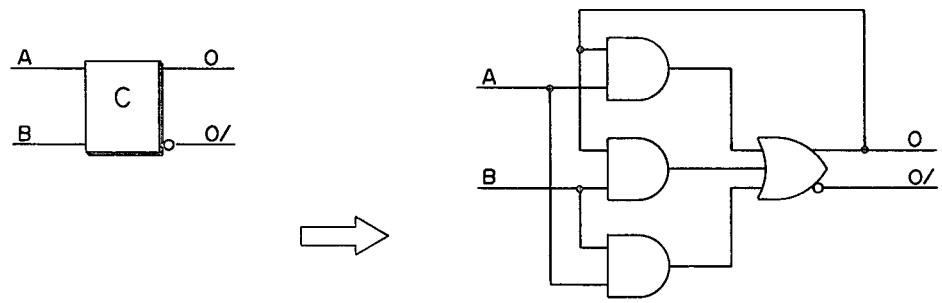
*Fig. 6A*    BASIC C-ELEMENT
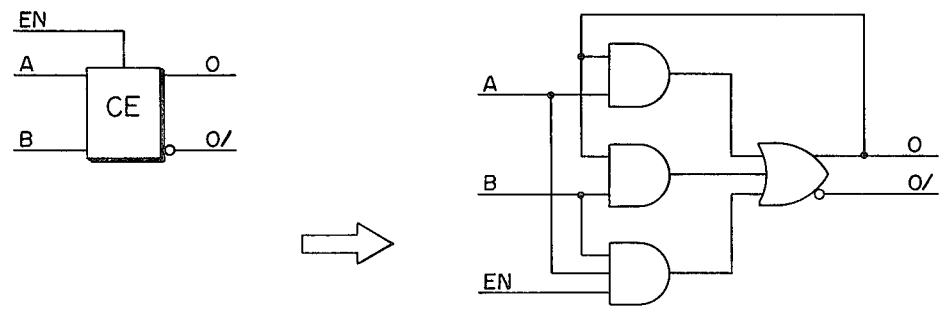
*Fig. 6B*    C WITH ENABLE
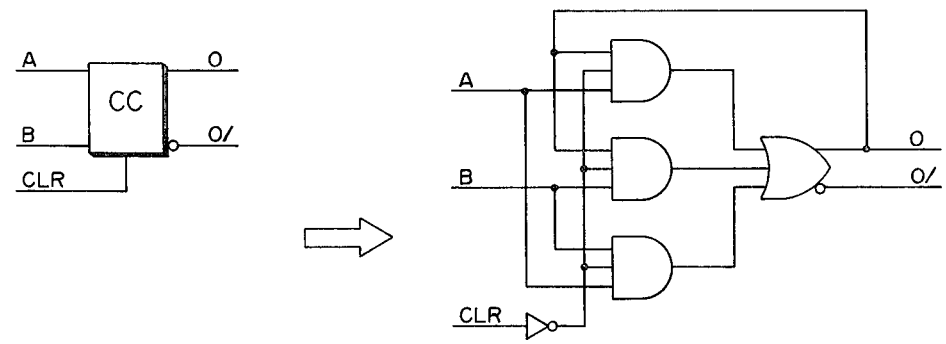
*Fig. 6C*    C WITH CLEAR

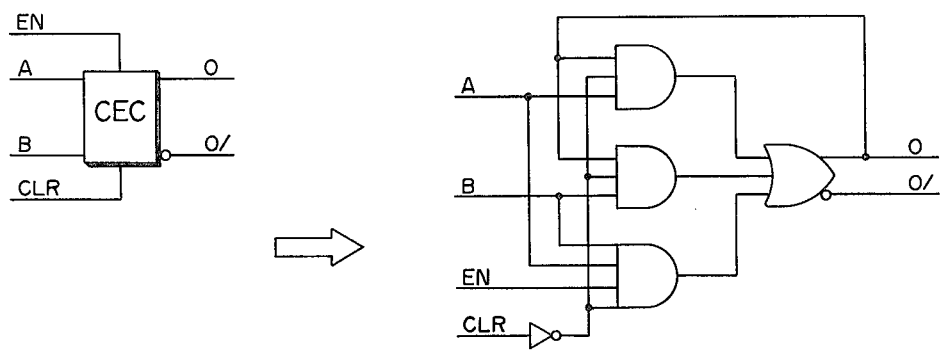
*Fig. 6D*   C WITH ENABLE AND CLEAR
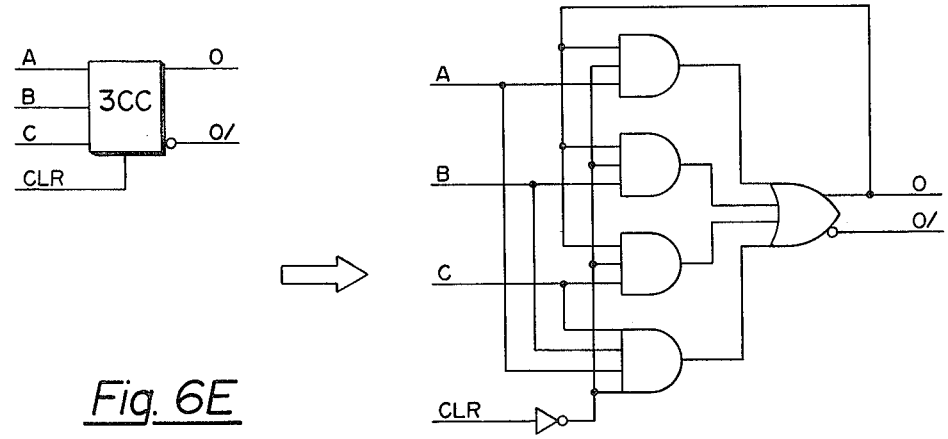
*Fig. 6E*   3 INPUT C WITH CLEAR

ARBITER SWITCH FOR A CONCURRENT NETWORK OF PROCESSORS

RELATED U.S. PATENT APPLICATIONS

U.S. patent applications directly or indirectly related to the subject application are the following:

Ser. No. 329423, filed Dec. 10, 1981 by Brent C. Bolton et al and entitled "A Selector Switch for a Concurrent Network of Processors".

BACKGROUND OF THE INVENTION

1. Field of the Invention

This invention relates to an arbiter switch for an asynchronous network of concurrent processors and more particularly to such a switch which is adapted to be cleared when it is part of the node in the network that has become clogged by a message passing through the network.

2. Description of the Prior Art

Arbiter switches and selector switches are employed in the formation of networks for asynchronous transmission from one source node to one of a number of destinations in the network. An arbiter switch is a switch which receives such asynchronous transmission from one of two different input ports and transfers that message in an asynchronous manner to its output port. Such an arbiter switch is disclosed in detail in the Clark U.S. Pat. No. 4,251,879 which is assigned to the assignee of the present invention. A selector switch is a switch which receives a message on its input port and transmits it to one of two output ports according to the first bit in the serial transmission to be received. Such a selector switch is disclosed in the Clark U.S. Pat. No. 4,237,447 which is assigned to the assignee of the present invention. By employing these two switches, various networks of a variety of configurations can be created as is described in the Barton et al. patent application Ser. No. 035,314, filed Feb. 2, 1979 and assigned to the assignee of the present invention.

In the implementation disclosed in the above described patents, when it is desired for one node to transmit a message to another node, it begins its transmission which establishes a path between respective nodes, which path becomes dedicated to that transmission until an end-of-message signal is received by the destination and an acknowledge end-of-message signal is transmitted back through the various switches of the network forming the path to the source. This causes a delay in freeing the network for the establishment of different transmission paths due to the time that it takes for the end-of-message signal to reach the destination and the acknowledge end-of-message signal to be transmitted back to the source. Of equal importance in a concurrent network, after a few paths have been established between different nodes, it becomes increasingly difficult for other sources in the network to establish a transmission path for transmission to one of the destinations. As a practical matter, the problems of tying up a goodly portion of the network are increased by the possibility of a malfunction of a component in one of the nodes or switches so that it does not react to the appropriate end-of-message acknowledgment signal.

In the above-described Clark patents, a particular node is cleared only by the reception of an acknowledgment end-of-message signal with the inherent problems that were discussed above. Therefore, it is advantageous to be able to have a network of such switches that may be "cleared" or reset whenever a transmitting processor determines that one or more switches in a particular transmission path are no longer operative.

It is, then, an object of the present invention to provide an improved arbiter switch for an asynchronous network of concurrent processors.

It is another object of the present invention to provide an improved arbiter switch for such an asynchronous network wherein a particular transmission path is not continuously dedicated for the duration of transmission of a particular message along the path.

It is still a further object of the present invention to provide an improved arbiter switch for such an asynchronous network which may be cleared or reset when it is determined that a particular path in the network is not operating properly.

SUMMARY OF THE INVENTION

In order to achieve the above-identified objects, the present invention is directed toward an arbiter switch to receive a transmission from one of two input ports and to transmit that message to its output port. In addition to receiving such a message, the arbiter switch also is adapted to receive a clear signal from either of the input ports which resets the switch to its idle state and transmits that clear signal on to the output port.

A feature then of the present invention resides in an arbiter switch which is adapted to be set to its idle state by a clear signal received from one of two input ports and to transmit that clear signal on to the output port.

BRIEF DESCRIPTION OF THE DRAWINGS

The above and other objects, advantages, and features of the present invention will become more readily apparent from a review of the following specification when taken in conjunction with the drawings wherein:

FIG. 2 is a representation of the manner in which the arbiter switch of the present invention is interconnected with selector switches;

FIG. 3A is a representation of a message that might be transmitted through the network employing the present invention;

FIG. 3B is a representation of the port interface between the arbiter switch of the present invention and other switches;

FIGS. 6A, . . . , E are schematic diagrams of the respective consensus gates employed in the present invention.

GENERAL DESCRIPTION OF THE INVENTION

Figure 1:
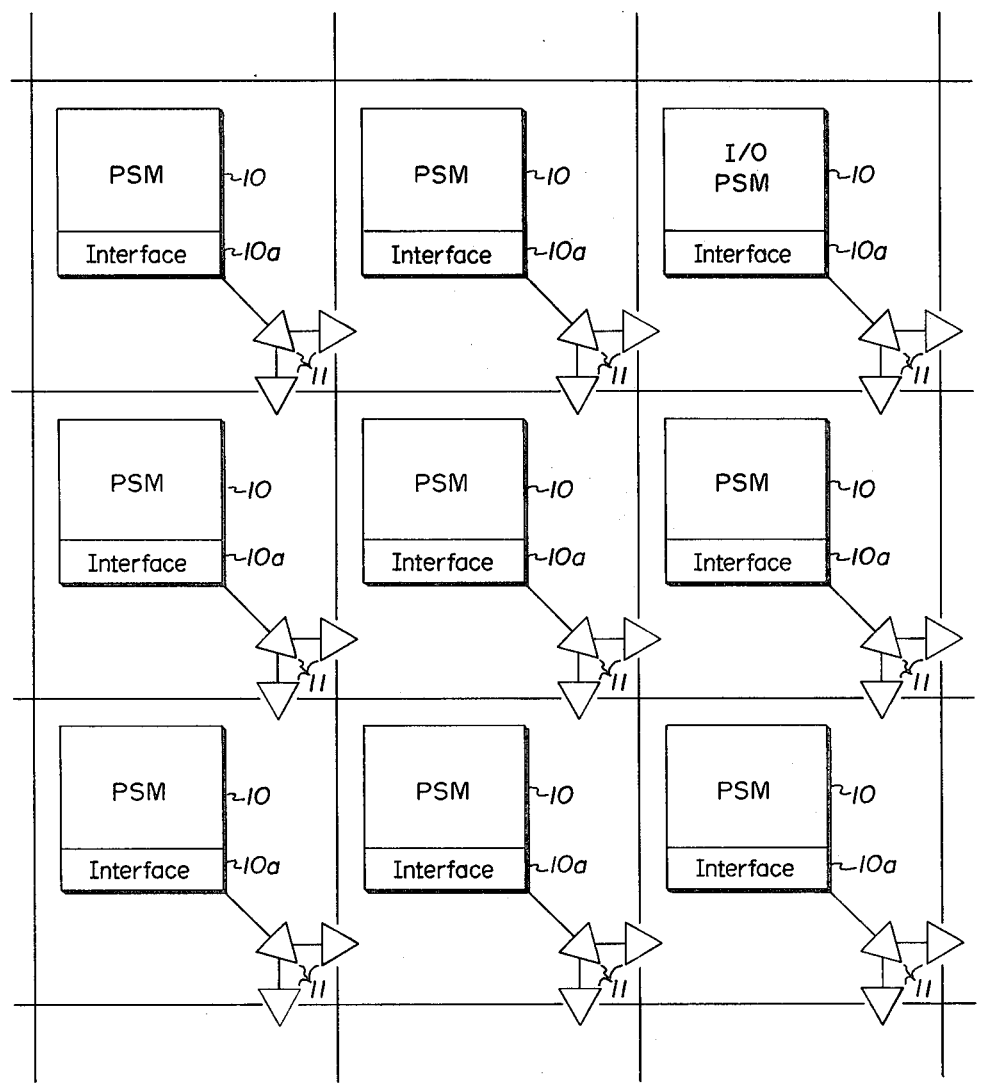
FIG. 1 is a representation of an asynchronous network of concurrent processors which network employs the present invention.

A concurrent network of processors, or more particularly processor and storage modules, is illustrated in FIG. 1 wherein the respective processor storage modules 10 are coupled together by a nearest neighbor switching network that is formed of hexagonal configurations 11 of speed independent arbiter and selector switches. In FIG. 1, three hexagonal configurations 11 are required for coupling the corresponding processor storage module 10 to the network. A more detailed illustration of a respective hexagonal configuration is illustrated in FIG. 2 where three arbiter switches 12 and three selector switches 13 are employed. Such a hexagonal configuration receives transmission from three different sources and provides transmission to three different destinations and it is for this reason that the configurations are illustrated in FIG. 1 by triangular symbols 11 and that three such configurations are required to couple each processor storage module to its four nearest neighbors in a rectangular matrix-type of network. Such a rectangular matrix is disclosed in the Hagenmaier et al patent application Ser. No. 281,065, filed July 7, 1981 and assigned to the assignee of the present invention. As was indicated above, other types of networks are described in the above-referenced Barton et al. patent application.

Transmission between nodes is asynchronous and in a serial manner and the switching by each of the selector switches is according to the first bit in the routing field of the message being transmitted, which bit is removed as the message and its routing field pass through that selector switch. Thus, the routing field serves as a routing map for the message as it traverses the network. In order to accommodate each serial transmission, each of the processor storage modules of FIG. 1 is provided with a corresponding communication's interface 10a which includes a parallel-to-serial buffer register since the data transfer between the processor and the memory of the respective modules would normally be in a parallel manner.

The format of such message transmission is illustrated in FIG. 3A and begins with (from right to left) the routing field which is then followed by a destination name, source name, data being transmitted, an error-checking field, and an end-of-message signal. The interface between the respective switches is illustrated in FIG. 3B, it being understood that two such interfaces are required for transmissions in opposite directions. Each interface includes a data group of signal lines and a clear group of signal lines.

The data group is made up of three signal lines in the forward direction, "T" (true), "F" (false), and "E" (end) to signal the end-of-message. In the reverse direction, the data group also includes a "VEFT" (vacant end, false, true) to acknowledge the transmission of each of the data characters, which acknowledgment is required between the respective switches to accommodate asynchronous transmission.

The clear group of signal lines employs a forward signal "C" (clear) and a reverse signal "VC" (vacant clear). The clear group of signals is employed for clearing or resetting one or more transmission paths in the event that the transmission path becomes locked in or "stuck" due to any malfunction which prevents the completion of the message transmission. It will be appreciated that without the "clear" feature, any purely asynchronous system can become "stuck" as the system cannot distinguish between an event that has not yet occurred (but eventually will) and one that will never occur. Thus, whenever a transmitting processor determines that a desired transmission path has become "stuck", that processor will issue a clear signal to clear a path through the network. Any messages that may be corrupted by the clear will eventually be retransmitted by their sender.

DETAILED DESCRIPTION OF THE INVENTION

As was indicated above, the arbiter of the present invention makes wide use of consensus gates or C-elements which in essence are memory devices with two or more inputs and one output such that the C-element retains its previous state as long as its inputs do not agree with each other, but tends toward the state of the inputs whenever they contain identical values. That is to say, such a C-element is a latch type device which retains its previous state until such time as all of its inputs have changed to the same state.

Figure 4A:
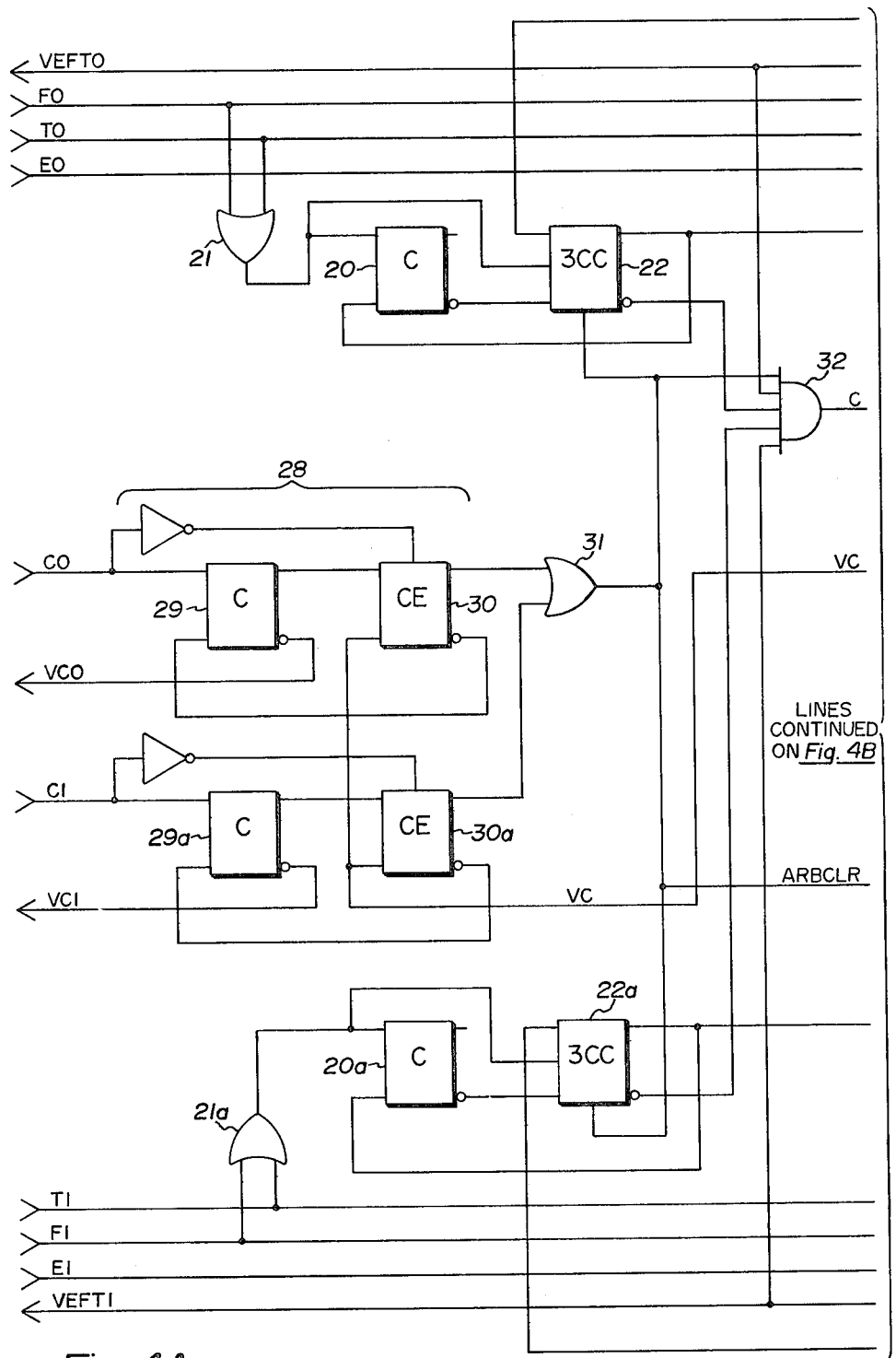
FIGS. 4A and 4B are detailed schematic representations of the arbiter switch of the present invention.
Figure 4B:
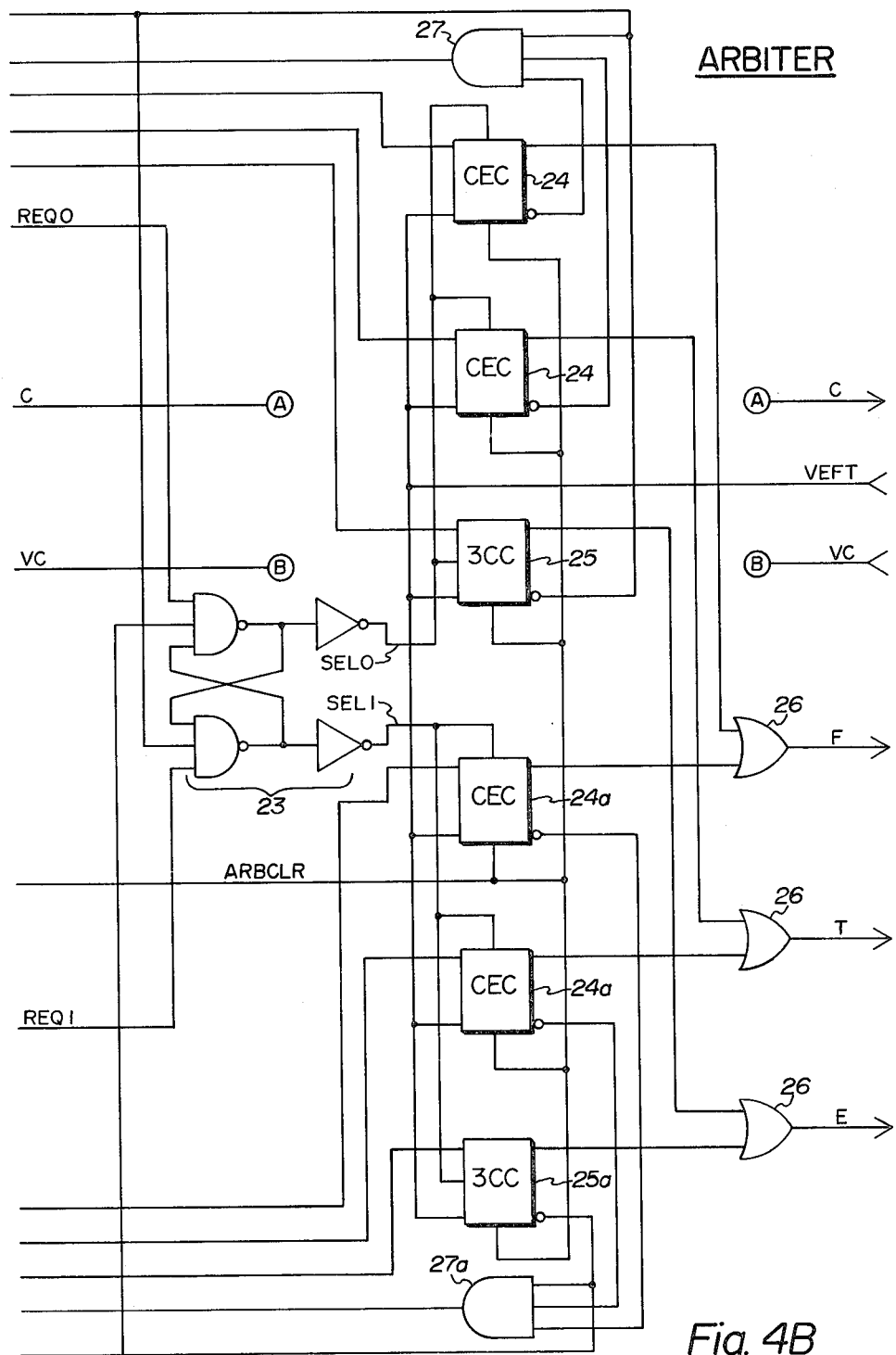

The arbiter switch of the present invention is illustrated in FIGS. 4A and 4B and will now be described. It is to be remembered that the arbiter switch receives signals from two different inputs and routes them to a single output. In the present invention, the arbiter switch reacts to a change in signal levels as distinct from the actual voltage levels themselves. That is to say, the input ports have edge detection capability. To this end, in FIG. 4A, input consensus gates 20 and 20a are consensus gates that respond to signal changes on input lines F0, T0, and T1, F1 respectively by way of OR gates 21 and 21a. The specific circuitry of consensus gates 20 and 20a is illustrated in FIG. 6A.

The inverted outputs of the respective input circuits 20 and 20a are supplied along with the corresponding input signals to consensus gates 22 and 22a respectively where the edge detection is performed. The actual circuitry of consensus gates 22 and 22a is illustrated in FIG. 6E.

Arbitration circuitry 23 receives the output signals of the respective edge detectors 22 and 22a and generates one of two output signals indicating which of edge detectors 22 and 22a was the first to detect a signal change on its corresponding input line. The output of arbitration circuitry 23 then chooses the appropriate input port for the transfer of that signal through the arbiter to the output port. The respective C-gates 24 and 24a are to receive and store either a true or false signal $T_0$ or $F_0$ (or $T_1$ or $F_1$) respectively. The actual circuitry of these C-gates is illustrated in FIG. 6D. The C-gates 25 and 25a are for receiving the corresponding end-of-message signals $E_0$ or $E_1$ respectively. The actual circuitry for these C-gates is illustrated in FIG. 6E. The corresponding signal selected for transmission to the next node is then supplied thereto by way of OR gates 26.

At the time the corresponding output C-gate is set, its inverted output is sent back to the previous switch by way of AND gates 27 or 27a to indicate that the signal has been received.

The clear circuitry 28 of the arbiter receives a clear signal C0 or C1 from one of two input ports which sets the clear input C-gates 29 or 29a respectively and transfers that signal to the clear enable C-gates 30 and 30a. The output signals from either one of these C-gates then resets the circuitry by way of OR gate 31 and the clear receipt acknowledgment is sent back by the inverted output of one of the respective consensus gates 29 or 29a.

Figure 5A:
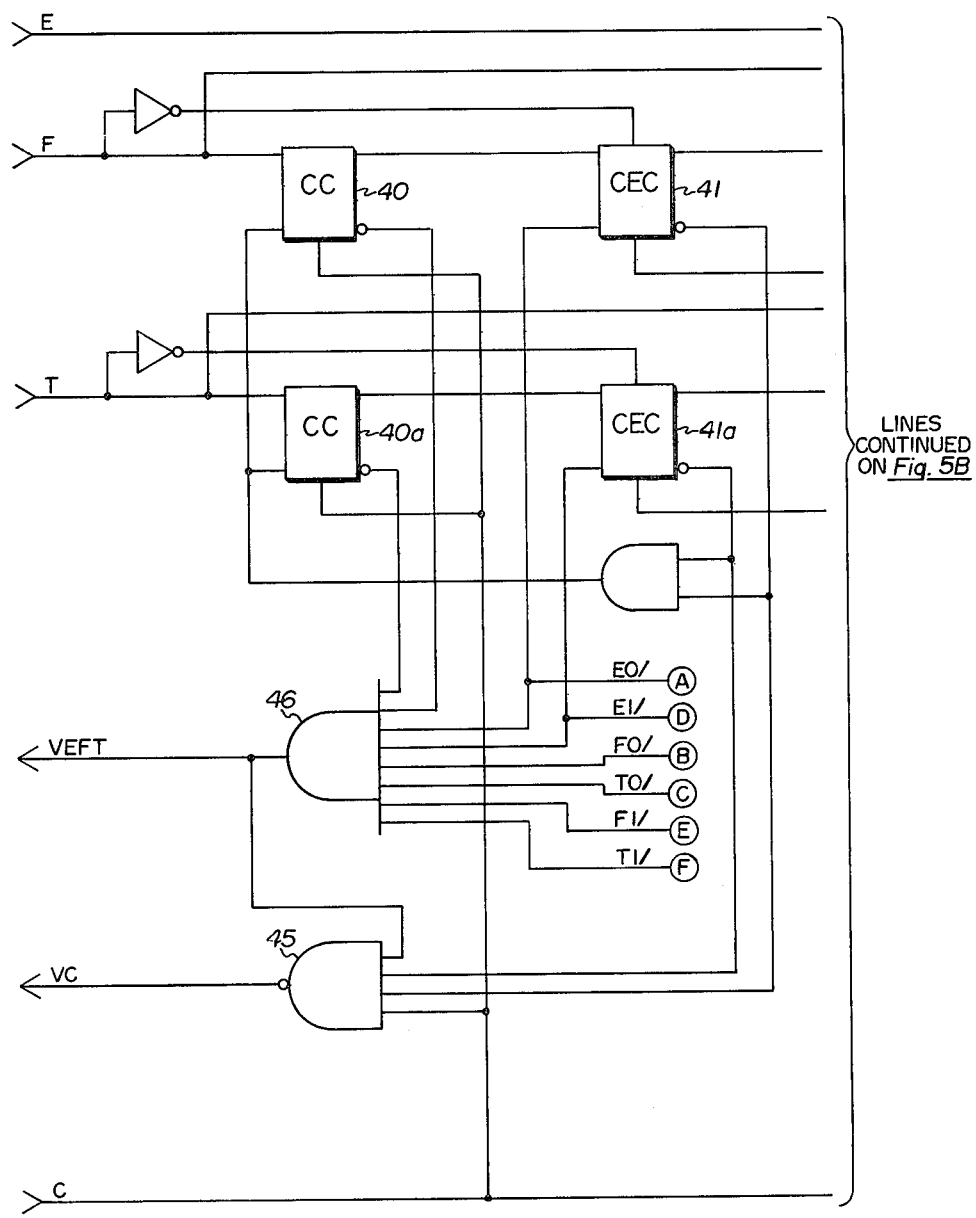
FIGS. 5A and 5B are detailed representations of a selector switch as employed with the present invention.
Figure 5B:
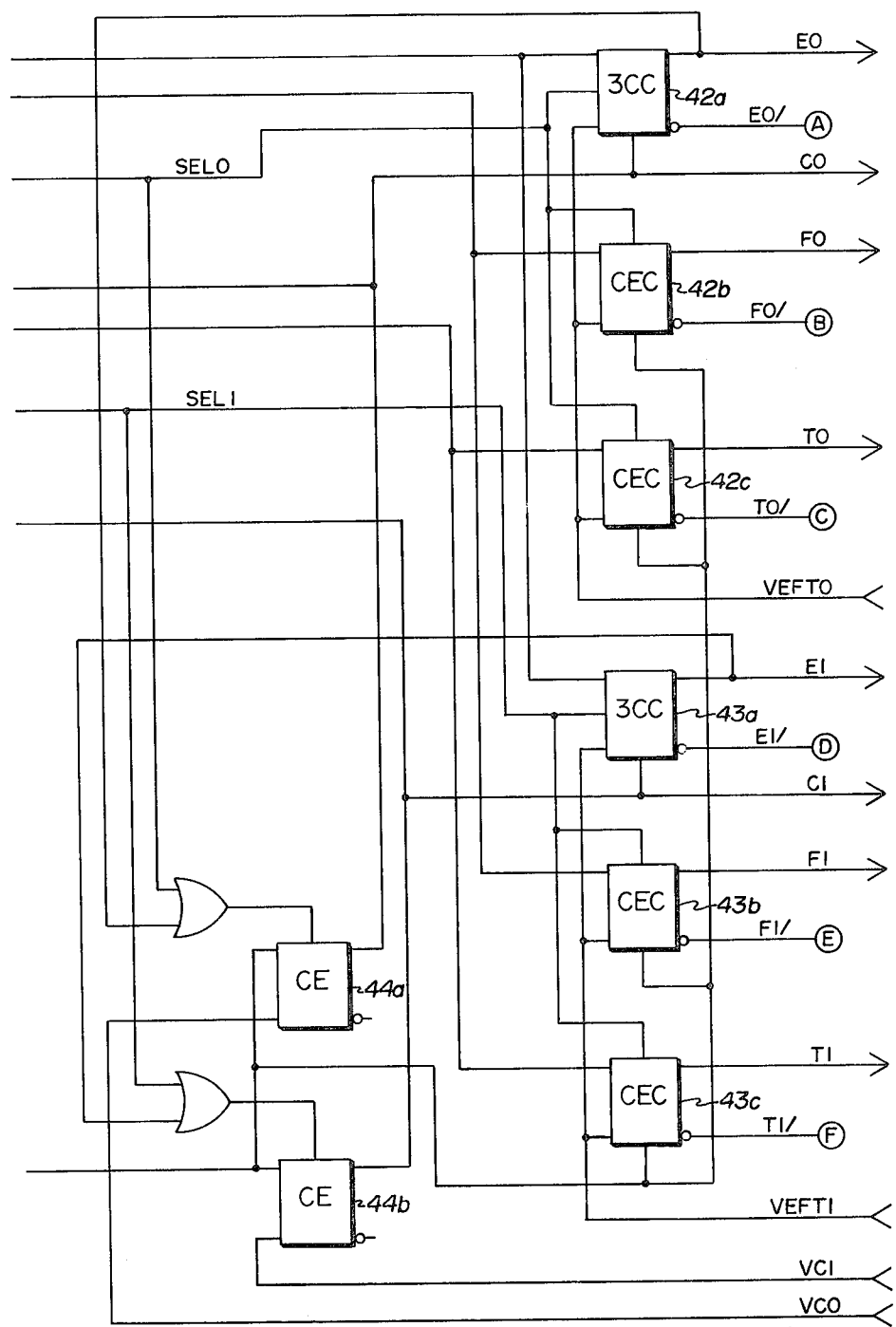

The selector switch of the present invention is illustrated in detail in FIGS. 5A and 5B. It will be remembered that the selector switch receives a message on its single input port and routes that message to one of two output ports according to the first bit in the serial transmission of the message, which bit is discarded at the time of selection.

Referring now to FIG. 5A, the first incoming bit of the message is received by either consensus gate 40 or 40a depending upon whether it is a true or false signal. The corresponding gate generates an acknowledge signal which is transmitted back to the sender by way of AND gate 46 and also sets the corresponding consensus enable gate 41 or 41a which selects the appropriate output port for transmission of the remaining portion of the routing field and the message. This first bit has now been discarded. Detailed schematics of C-gates 40 and 40a are illustrated in FIG. 6A and detailed schematic diagrams of C-gates 41 and 41a are illustrated in FIG. 6D.

The two output ports are shown in FIG. 5B and are respectively either C-gates 42a, 42b and 42c, or 43a, 43b and 43c. Schematic diagrams of gates 42a and 43a are illustrated in FIG. 6E while the schematic diagrams of C-gates 42b and 42c and 43b and 43c are illustrated in FIG. 6D.

When the CLEAR signal of the present invention is received by the selector switch, it serves to clear all the gates of FIG. 5A and also to set C-gates 44a and 44b for the selected output port. This serves to transmit that clear signal on to that one of the output ports which has been selected so as to pass the clear signal on to the next switch in the transmission path.

It will be noted from FIG. 5A that the receipt of a clear signal will be acknowledged by a transmission back of the vacant clear signal by way of NAND gate 45. If the selector switch is in an idle state, the clear signal is not propagated further since no output port has been selected. However, if the selector switch has been set for transmission from either of its output ports, then the clear signal is passed on through that particular output port.

It will be noted, however, from FIGS. 4A and 4B that when a clear signal is received by the arbiter switch, it is passed on to its output port for transmission to the next switch in the transmission path whether or not the arbiter is in an idle state.

EPILOGUE

An arbiter switch and a selector switch have been described from which an asynchronous network of concurrent processors can be formed where the arbiter switch receives a message from one of two input ports and transmits it to its output port while the selector switch receives a message from one input port and transmits it to one of two output ports in accordance with the first bit in the serial message. A path through the network which has been estabished can be cleared should it become apparent that that particular path has become locked in due to a malfunction of a component in one of the nodes or switches in the network.

While but one embodiment of the present invention has been disclosed, it will be apparent to those skilled in the art that variations and modifications may be made therein without departing from the spirit and the scope of the invention as claimed.

What is claimed is:

1. An arbitration switch for receiving digital data signals and a clear signal from two different sources in a digital communication network and transmitting those signals to a designation, said switch comprising:

a pair of input ports one for each of said two different sources to receive said digital data signals and said clear signal from each of said two different sources;

an arbitration circuit means coupled to said input ports to receive said digital data signals and to select the first set of data signals to be received for subsequent transmission to said destination; and clear circuit means to receive a clear signal from one of said two different sources by way of one of said input ports, said clear circuit means being coupled to said input ports and to said arbitration circuit means to reset said input ports and said arbitration circuit means.

2. An arbitration switch according to claim 1 further including:

an output port coupled to each of said input ports and to said selection means to receive data signals and said clear signal from the input port selected by said selection circuit means and to transmit said signals to said destination.

3. An arbitration switch according to claim 1 wherein:

said input ports and said output port include consensus gate means having a plurality of inputs and an output, said consensus gate means changing its output from one state to the other only when all of its inputs have changed to said other state.

4. An arbitration switch according to claim 3 wherein:

said consensus gate means include latch circuits which retain their previous state until such time as all the inputs have changed to another state.

5. An arbitration switch according to claim 4 wherein:

said input port consensus gate means are adapted to respond to a signal transition from one state to another.

6. An arbitration switch for receiving digital data signals and a clear signal from two different sources in a digital communication network and transmitting those signals to a destination, said switch comprising:

a pair of input ports one for each of said two different sources to receive said digital data signals and said clear signal from each of said two different sources;

an arbitration circuit means coupled to said input ports to receive said digital data signals and to select the first set of data signals to be received for subsequent transmission to said destination;

clear circuit means to receive a clear signal from one of said two different sources by way of one of said input ports, said clear circuit means being coupled to said input ports and to said arbitration circuit means to reset said input ports and said arbitration circuit means; and clear acknowledgment means coupled to said sources and adapted to signal a source sending a clear signal that the clear signal has been received.

7. An arbitration switch according to claim 6 further including:

an output port coupled to each of said input ports and to said selection means to receive data signals and said clear signal from the input port selected by said selection circuit means and to transmit said signals to said destination.

8. An arbitration switch according to claim 6 wherein:

said input ports and said output port include consensus gate means having a plurality of inputs and an output, said consensus gate means changing its output from one state to the other only when all of its inputs have changed to said other state.

9. An arbitration switch according to claim 8 wherein:

said consensus gate means include latch circuits which retain their previous state until such time as all the inputs have changed to another state.

10. An arbitration switch according to claim 9 wherein:

said input port consensus gate means are adapted to respond to a signal transition from one state to another.

* * * * *